US009652721B2

United States Patent
Outwater et al.

(10) Patent No.: US 9,652,721 B2
(45) Date of Patent: May 16, 2017

(54) SYSTEM AND METHOD FOR SECURE ADDITION OF MACHINE READABLE IDENTIFICATION TO AN OFF-LINE DATABASE

(75) Inventors: Chris Outwater, Santa Barbara, CA (US); William Gibbens Redmann, Glendale, CA (US)

(73) Assignee: Liberty Plugins, Inc., Santa Barbara, CA (US)

( * ) Notice: Subject to any disclaimer, the term of this patent is extended or adjusted under 35 U.S.C. 154(b) by 569 days.

(21) Appl. No.: 13/989,632

(22) PCT Filed: Nov. 22, 2011

(86) PCT No.: PCT/US2011/061969
§ 371 (c)(1),
(2), (4) Date: May 24, 2013

(87) PCT Pub. No.: WO2012/071478
PCT Pub. Date: May 31, 2012

(65) Prior Publication Data
US 2013/0238536 A1      Sep. 12, 2013

Related U.S. Application Data

(60) Provisional application No. 61/417,055, filed on Nov. 24, 2010.

(51) Int. Cl.
*G06N 99/00* (2010.01)
*B60L 11/18* (2006.01)
(Continued)

(52) U.S. Cl.
CPC ........ *G06N 99/005* (2013.01); *B60L 11/1846* (2013.01); *B60L 11/1848* (2013.01);
(Continued)

(58) Field of Classification Search
CPC ............ G07C 9/00309; G07C 9/00182; G07C 9/00896; B60K 35/00; G06F 9/4446;
(Continued)

(56) References Cited

U.S. PATENT DOCUMENTS 4,532,418 A * 7/1985 Meese ................. B60L 11/1816
                                                    194/904
5,563,491 A * 10/1996 Tseng ................. B60L 11/1816
                                                    194/904
(Continued)

FOREIGN PATENT DOCUMENTS

KR       10-0685723 B1    2/2007
KR       10-2007-005570 A  5/2007

*Primary Examiner* — George Bugg
*Assistant Examiner* — Munear Akki
(74) *Attorney, Agent, or Firm* — Clifford H. Kraft

(57) ABSTRACT

A system that allows secure identification tokens (e.g., smart cards or RFID tags), often used for enabling such systems, to be securely added to a secure, local database of identification tokens authorized to operate the device, system or service. Such authorizations may be open-ended or have an expiration date. The addition of the identification token is achieved without requiring communication with a central controller by wired or wireless means, but is instead triggered by a message authorizing the addition of an identification token to the local database. The same invention can be used, in some embodiments, to allow magnetic stripe cards or biometric measurements to become authorized to operate or allow access to the system or device or service.

16 Claims, 8 Drawing Sheets

(51) Int. Cl.
*H04W 12/06* (2009.01)
*G07F 15/00* (2006.01)
*H04W 4/00* (2009.01)
*H04W 4/02* (2009.01)

(52) U.S. Cl.
CPC .......... *G07F 15/005* (2013.01); *H04W 12/06* (2013.01); *B60L 2230/16* (2013.01); *B60L 2230/40* (2013.01); *B60L 2240/72* (2013.01); *B60L 2240/80* (2013.01); *B60L 2250/20* (2013.01); *H04W 4/008* (2013.01); *H04W 4/021* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ..... G06F 21/31; G06F 21/32; G06Q 30/0224; B60R 25/04; Y02T 90/14
USPC ........ 340/5.2, 438, 5.1, 5.21, 5.22; 715/705; 705/14.25; 713/184–186; 320/109
See application file for complete search history.

(56) References Cited

U.S. PATENT DOCUMENTS

| | | | | |
|---|---|---|---|---|
| 5,742,229 | A * | 4/1998 | Smith | B60L 11/1824 235/381 |
| 6,644,557 | B1 * | 11/2003 | Jacobs | F24F 11/0012 236/46 R |
| 6,727,809 | B1 * | 4/2004 | Smith | G01C 21/26 320/109 |
| 2004/0064709 | A1 * | 4/2004 | Heath | G07C 9/00158 713/186 |
| 2005/0140496 | A1 * | 6/2005 | Magner | G07C 9/00674 340/5.54 |
| 2007/0245157 | A1 * | 10/2007 | Giobbi | G06F 21/31 713/186 |
| 2009/0313103 | A1 * | 12/2009 | Ambrosio | B60L 8/00 705/14.25 |
| 2011/0213656 | A1 * | 9/2011 | Turner | B60L 3/12 705/14.49 |
| 2011/0239116 | A1 * | 9/2011 | Turner | H02J 7/0027 715/705 |

* cited by examiner

SYSTEM AND METHOD FOR SECURE ADDITION OF MACHINE READABLE IDENTIFICATION TO AN OFF-LINE DATABASE

FIELD OF THE INVENTION

The present invention relates generally to valuable systems and devices and more particularly to the use of secure identification tokens with such systems.

DESCRIPTION OF THE PROBLEM AND INTRODUCTION

With many valuable systems and devices, it may be desirable to limit access to authorized users. One example is an electric vehicle charging station. A system and method is provided so that only authorized users can operate the system. As with many other systems, devices and services, connectivity to a central controller, e.g. by direct wiring or by wireless connection, can be expensive and/or unreliable. This is true for electric vehicle charging stations, storage or parking spaces, vehicle rental or other services that may be located underground (where wireless communication is difficult), near where vans or trucks travel (making wireless communication unreliable), or along a street (where installation of communication wiring requires jackhammers, digging, and cement).

SUMMARY OF THE INVENTION

The present invention allows secure identification tokens (e.g., smart cards or RFID tags), often used for enabling such systems, to be securely added to a secure, local database of identification tokens authorized to operate the device, system or service. Such authorizations may be open-ended or have an expiration date. The addition of the identification token is achieved without requiring communication with a central controller by wired or wireless means, but is instead triggered by a message authorizing the addition of an identification token to the local database. The same invention can be used, in some embodiments, to allow magnetic stripe cards or biometric measurements to become authorized to operate or allow access to the system or device or service.

Herein, for convenience of discussion, the terms RFID card, RFID ID, and RFID token are used as an example of a specific embodiment, but it should be understood that any secure, machine readable identification can be used, including smart cards requiring an electrical connection to be read, biometric values (e.g., fingerprints, iris scans, skin resistance, face recognition, voice print etc.), etc. Where a process for sensing a property other than an RFID card is described, those skilled in the art will recognize the corresponding device or property for their selected form of secure identification. For example, fingerprints are read by a fingerprint reader. Machine readable identifications such as barcodes or magnetic stripes can also be used with this invention, however, due to the ease with which they can be duplicated, an implementer should consider carefully whether they are appropriate for a particular security application. By way of example and not limitation, identification tokens suitable for use with the present invention include RFID type tokens, such as the identification cards, for example the 1326 ProxCard® II Clamshell Card and other products (including compatible readers) manufactured and distributed by HID Global of Irvine, Calif. In the examples discussed, access is being controlled to EV charging stations (also known as electric vehicle supply equipment, "EVSE"); however, the access control function could work with other devices, systems and services.

DETAILED DESCRIPTION OF THE INVENTION

In the present invention, various forms of identification token may be used, for example, RFID tags, cards having a magnetic stripe, cards having a barcode, biometric measurements, as previously discussed. In the following discussion, a particular example (RFID tags) is selected for clarity and convenience of discussion, however any other machine-readable identification token can be substituted and fall within the present teachings. Correspondingly, for each kind of machine readable identification token, (e.g., RFID tags), there is an appropriate reader, and in the following discussion, again for clarity and convenience, a particular example (RFID readers) is the appropriate counterpart to the example identification tokens selected.

Also, the present invention helps to manage controlled access to devices. In the following discussion, as an example, the device having access to it being controlled is electric vehicle service equipment (EVSE), which is the component in electric vehicle infrastructure that allows an electric vehicle to access the power grid and charge the vehicle's batteries. In some cases, an EVSE is in a publicly accessible area. It may be desirable to limit access to the electric charging services of the EVSE to individuals or vehicles that have paid or are otherwise entitled to that access (e.g., employees of the company operating a particular EVSE). In the following discussion, for the purpose of clarity and convenience in discussion, the device being controlled is an EVSE, and the EVSE with the access control components are collectively an electric vehicle charging station.

Figure 1:
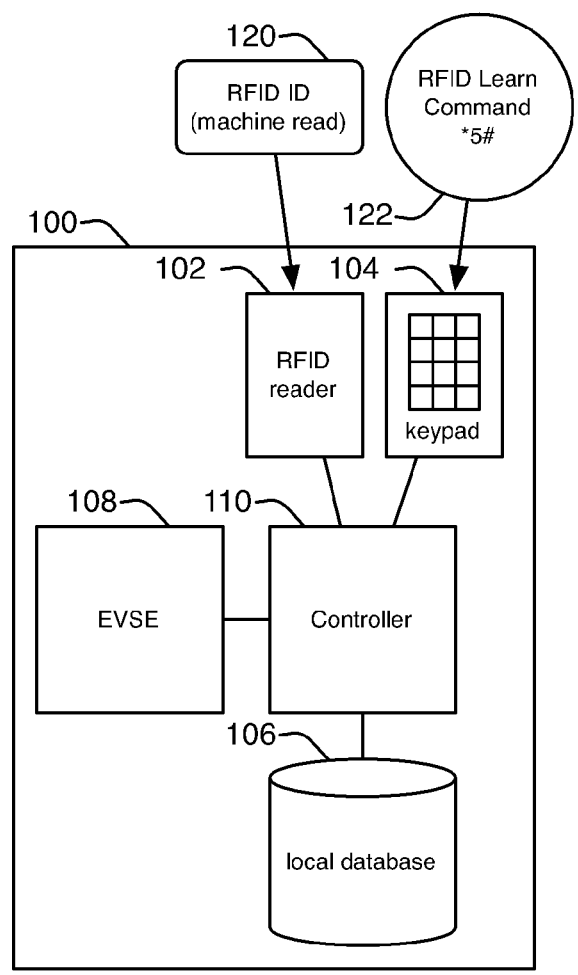
FIG. 1: is a block diagram of a system having a command for registering an identification token.

In FIG. 1, electric vehicle charging station 100 has an RFID reader 102 able to read RFID tag 120. Keypad 104 is used to enter commands, or to enter additional authentication (e.g., a PIN) in addition to the RFID tag 120 being read. Learn command 122 is a fixed sequence of key presses to be entered into keypad 104. In this example, a simple one-digit command surrounded by symbols predetermined to indicate the start and end of the command: "*5#". Controller 110 accepts learn command 122 entered on keypad 104 by a user, then RFID tag 120 is presented by the user and read by controller 110 with RFID reader 102. If necessary, additional authentication can be provided by the user through keypad 104 (or other device, depending on the nature of the additional authentication, not shown).

In response to the correct execution of this sequence, the controller 110 is programmed to learn the presented RFID 120: Once a correct learn command 122 has been entered into keypad 104 and accepted, and the RFID tag 120 is read, data representative of the RFID tag 120 is recorded in local database 106. Subsequently, whenever RFID tag 120 is presented and read by RFID reader 102, controller 110 can recognize RFID tag 120 on the basis of the data stored in database 106. Upon recognizing the identification, controlled device 108 (i.e., in this example, EVSE 108) is activated or access is otherwise enabled.

"Data representative" of RFID tag 120 may be at least a portion of the data stored on the RFID tag, for example, a unique identification number. In an embodiment where a credit card is used as an identification token instead of RFID tag, and a magnetic stripe read is used instead of an RFID reader, the data representative of the identification token could be all or part of the credit card number, and even additional authentication information recorded on credit card magnetic strips. However, under some security policies, it may be inappropriate to store these actual identification numbers. In such cases, the "data representative" of RFID tag 120 (or other identification) may be encrypted or hashed".

Figure 2:
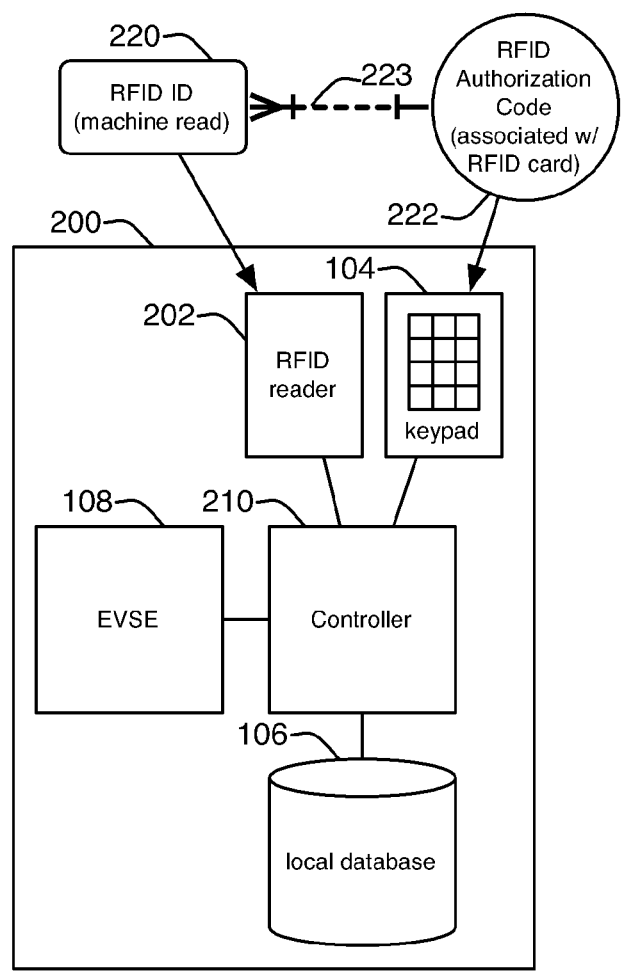
FIG. 2: is a block diagram of a system requiring an authentication code for registering an identification token.

FIG. 2 is similar to FIG. 1, except that RFID authorization code 222 is specific to RFID identification token 220. In one embodiment, RFID authorization code 222 is printed on identification token 220 and is readable while causing system 200 to learn identification token 220. Controller 210 receives the code 222 entered into keypad 104, and the identification read by reader 202 from identification token 220. Controller 210 determines whether code 222 and the identification token 220 correspond (described in more detail below in conjunction with FIGS. 4 and 8), and if so, records data representative of the identification 220 in local data base 106 so that identification token 220 may be recognized when presented to reader 202 in the future to obtain access to controlled device (EVSE) 108.

Note that the relationship 223 between RFID-authorization code 222 and RFID identification token 220 is (using entity-relationship notation) such that for any RFID ID 220, there is exactly one corresponding code 222, but that for a given code 222, there may be one or more corresponding IDs 320 (if there was no association between code 222 and identification token 220, then station 200 would be equivalent to station 100). An example where there might be other than a one-to-one correspondence between a code 222 and an identification token 220 would be where within a batch of RFID ID cards issued to a single entity, each card shares a common attribute (e.g., all their unique identification numbers fall within a particular range, or they all share a common group identifier, etc.), and on the basis of that common attribute, they all also share a common authorization code 222.

Figure 3:
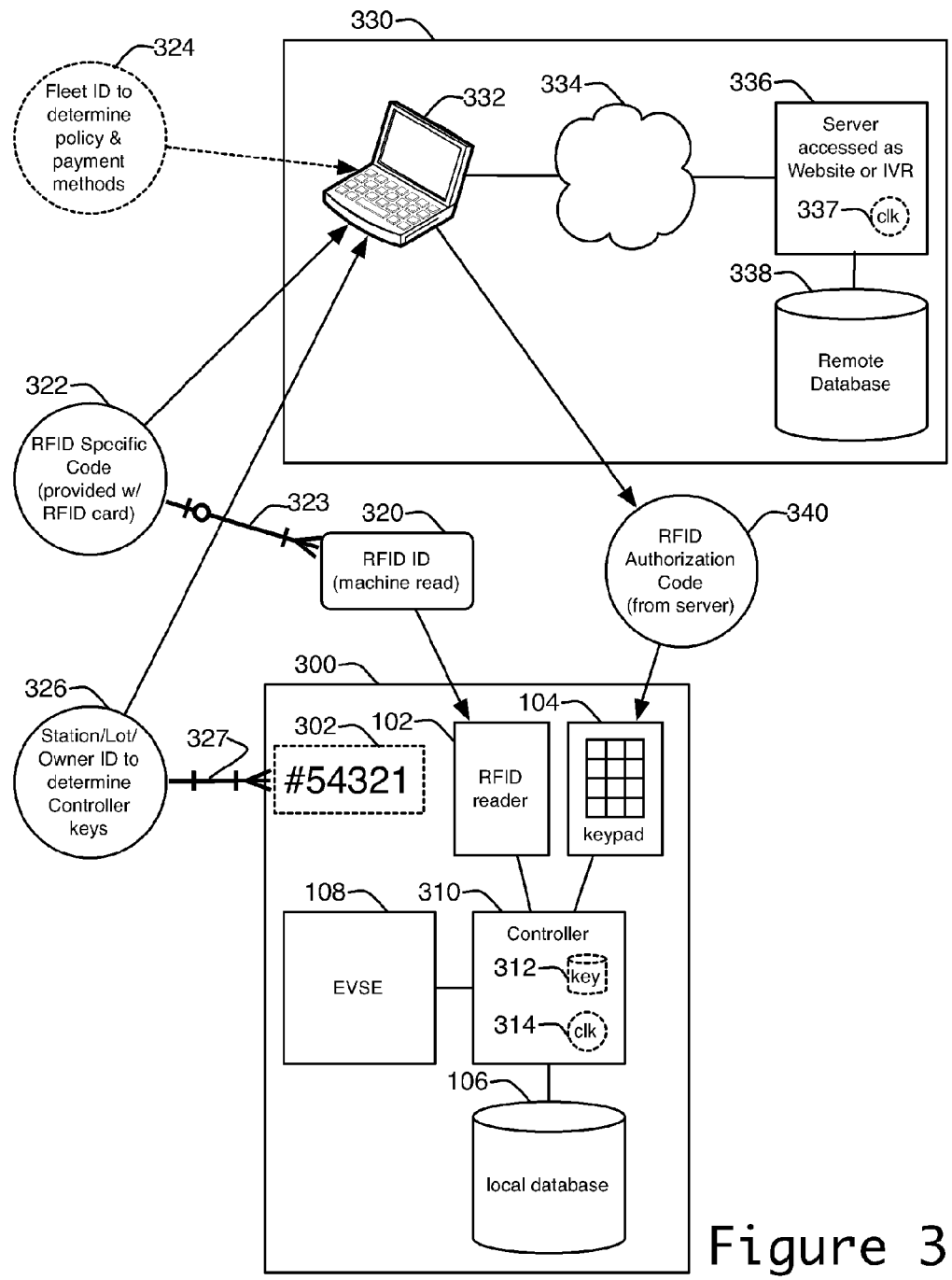
FIG. 3: is a block diagram of a first system requiring a custom authentication code customized to register an identification token with the first system, and a second system for issuing such customized codes.

In FIG. 3, system 300 is similar to that of system 200, keypad 104 accepts RFID authorization code 340, which instructs controller 310 to learn identification token 320. However, in FIG. 3, RFID authorization code 340 entered into keypad 104 comes from authorization generating system 330, whereas in FIG. 2 the RFID-specific authorization code 222 may have been printed directly on RFID ID 220.

RFID-specific code 322, which in some embodiments is printed directly onto RFID ID 320, is not entered into keypad 104 (as was code 222). Instead, RFID-specific code 322 and/or other information (discussed below and in conjunction with FIG. 4) is provided to authorization generating system 330, which in turn replies with RFID authorization code 340. In this way, if authorization code 340 is created using RFID-specific code 322, then authorization code 340 may contain information related to RFID identification 320, because authorization generating system 330 knows something about RFID identification 320. But authorization code 340 may contain other information, in addition to, or instead of, information about RFID identification 320. This can provide a more versatile command than used with system 200. For example, RFID authorization code 340 can provide a command that has a short expiration window require near-immediate use, since the code 340 can be generated nearly on demand; whereas authorization code 222 is typically generated further in advance and provided in written form (as in an instruction sheet) or is printed on the RFID card 220 itself.

Other information that may be used to generate authorization code 340 is discussed below and in conjunction with FIG. 4.

Note that the relationship 323 between RFID-authorization code 322 and RFID identification token 320 is (again using entity-relationship notation) such that for any RFID ID 320, there is zero or one corresponding code 322, but that for a given code 322, there may be one or more corresponding IDs 320, much as with relationship 223. However, relationship 323 introduces the case where there may be "zero" RFID-specific codes 322, for instance as may apply in those embodiments where a biometric measure is used instead of RFID tag technology as the identification being learned by station 300, though in some biometric implementations, a personal identifying number (e.g., a social security number, driver's license number, credit card number, etc. could be used in a manner similar to RFID-specific code 322) may be used, thereby establishing that a non-zero association could exist between an authorization code 322 and a biometric embodiment of identification 320.

In one embodiment, authorization code generating system 330 may be implemented as a single computer running software that accepts RFID specific code 322 (and perhaps other information, as described below), and in response, returns RFID authorization code 340 on the basis of some relationship or calculation that leads from the code 322 to the authorization code 340. For example, such a system could be implemented with a smart phone, or other portable computer.

However, the embodiment in FIG. 3 shows authorization code generating system 330 as a multi-computer system, interconnected via the Internet 334 or other communication channel. User interface device 332 may comprise a personal computer, portable computer, or smart phone; and provides a user interface that accepts RFID-specific code 322 (and in some embodiments other information) from the user and returns RFID authorization code 340 to the user. However, the processing that takes in one code and returns the other uses database 338, shown in this case as being remote. Database 338 contains information to provide or assist in providing authorization code 340 given RFID-specific code 322 and/or other information. In this embodiment, the process that produces authorization code 340 is performed with software running on remote server 336 with access to database 338. Server 336 can provide a web site, in which case the user interface device 332 may comprise a browser running on a PC or smart phone. In another embodiment, instead of a browser, a specialized application can be used to interact with server 336 (whether server 336 implements a web server or another remote service).

If a transaction in which RFID authorization code 340 is generated and provided to a user requires a subscription, then database 338 would have corresponding subscription information to ensure that the requirement is met before providing the code 340. If a transaction requires that a fee be paid by credit card, then server 336 would have communication with a receiving bank (i.e., a credit card transaction clearinghouse, not shown). Implementation details for such embodiments are within the capability of those skilled in the art.

In another alternative embodiment, user interface device 332 can be a mobile telephone, communication channel 334 can be a telephone network, and server 336 can be an interactive voice response system (IVR) programmed to request code 322 (e.g., through the touch-tone keys of the phone 332), and return the RFID authorization code 340 using computer generated or controlled speech.

Other information that may be used to generate authorization code 340 can include the identity of station 300. In order to consider the identity of station 300, the station 300 may display identifying indicia 302, which may be unique or may be common to multiple units. The indicia 302 may uniquely identify station 300, or it may be common to multiple stations 300 collected in a single area (e.g., a parking lot, or the stations located along a particular stretch of a downtown street), or it may identify stations belonging to a particular owner or run by a particular operator (herein, owner and operator are treated as being the same entity, but note that providing a system for which owners and operators are separate entities are well within ordinary skill in the art). Indicia 302 may be numeric, in order to make it easy for a user to enter into other systems (e.g., 330). A user may read indicia 302 and provide it as station/lot/operator ID 326 to authorization generating system 330, in this example by entering it into user interface device 332 of system 330. In this example, RFID-specific code 322 is also provided to system 330 through the same interface.

Note that in an alternative embodiment, indicia 302 may be machine readable, e.g., using a barcode, or be substituted or supplemented by another technology (e.g., an RFID tag, not shown, affixed to and identifying the station 300), in which case user interface device 332 may include a reader (not shown) such as a barcode scanner (not shown, which may comprise a camera) or an RFID reader suitable for reading the RFID tag used in lieu of indicia 302. In such an alternative embodiment, the same RFID reader may also read RFID ID 320 to collect RFID-specific code 322 (which may then be identical to the identification information conveyed by identification token 320) to be provided to authorization generating system 330. As stated above, the use of RFID for identification token 320 is as an example only. If identification token 320 were biometric in nature, then a reader, if used as discussed here for conveying information 322 to authorization generating system 330, would comprise a biometric reader of the appropriate type.

Providing RFID-specific code 322 to authorization generating system 330 allows RFID authorization code 340, as a matter of policy, to be customized to RFID 320, so that authorization code 340 will not work, or is unlikely to work, with a substantially different RFID ID 320 (in this case, "substantially different" meaning not a member of the same group or batch of RFID ID cards 320, which in some implementations may be deliberately similar in some ways, e.g., sharing a common data attribute or numeric range. Such a restriction over which ones of multiple RFID IDs 320 may be registered with station 300 by using a single RFID authorization code 340 can be beneficial, since it is possible to limit the number of identification tokens 320 that can be registered using a single code 340 issued by system 330 to as few as one.

Providing station/lot/operator identification information 326 to authorization generating system 330 allows RFID authorization code 340, as a matter of policy, to be customized to station 300 so that authorization code 340 will not work, or is unlikely to work, with a substantially different station 300. In this case, "substantially different" means not a member of a group of stations 300 managed to all respond to the same codes 340: In some circumstances, a lot may be managed with all stations 300 configured to respond to the same authorization codes 340, whereas in other lots, each station 300 may be configured to respond to different authorization codes 340. The former would be typical if the code is to be issued before one has parked: The issued code must work on any station chosen. The latter would be typical if the code is issued after one has parked, because the specific station can be known with certainty, there is no need to allow codes that may be potentially re-used elsewhere. Thus, it can be the case that a code 340 provided for a first station 300 would not work for a second station 300 having a different indicia 302; whereas another management policy may allow a single code 340 to work at either the first or second stations 300, which may or may not have the same indicia 302, because the same indicia 302 would produce the same authorization code 340, but even for two distinct indicia 302 submitted as different station/lot/operator IDs 326 may refer to a common configuration in database 338 that leads to the same authorization code 340.

The predetermined policies relating to station/lot/operator ID 326 to which authorization generating system 330 adheres may be stored in database 338, or otherwise embodied in the software. Such policies may address, for example, hours during which authorization codes may be provided, a maximum number of stations 300 with which a specific RFID 320 may be registered, a limitation on which groups of RFID IDs 320 may be registered, a specific maximum duration for over which the registration of RFID ID 320 would be retained, the duration of the interval over which authorization code 340 remains operational, etc.

Indicia 302 (submitted to system 330 as station/lot/operator ID 326) may correspond to any of a unique identifier for station 300 (a station ID 326), a lot at which at least station 300 is located (lot ID 326), or a wider area, perhaps including multiple lots, where station 300 is at least one commonly owned and/or operated (operator ID 326). In each case, for station 300, there will be indicia 302, which may or may not be unique among other such stations 300, or there will be other indicia (not shown) providing identification usable for each of the stations 300 present. When the indicia is provided as station/lot/operator ID 326 to authorization generation system 330, the ID 326 can be used to selected the policies that will apply to the generation of RFID authorization code 340. In an alternative embodiment, geo-location information (e.g., from a GPS or other location-determining service, for example as a latitude/longitude pair), collected in proximity to station 300 may be used in lieu of ID 326, but in the same way: to unambiguously identify the correct station 300 (or collection of which station 300 is a member) that is associated with information representing the policies for station 300. In still another embodiment, such GPS information might be used to determine a short list of nearby stations, and the corresponding ID number for each from which might be selected the appropriate station/lot/operator ID 326 to be submitted.

Among the policies that are associated with station 300 and used by authorization generation system 330 to make RFID authorization code 340 may be time-varying authorization code. That is, RFID authorization code 340 may be different (for an otherwise identical request), based on the time at which the request is made, for example as determined by clock 337, accessible to server 336 or other component of system 330. Clock 337 should be in substantial synchronization with clock 314, so that when RFID authorization code 340 is presented to keypad 104 and controller 310, controller 310 can read clock 314 and use the current time to decode or compare to the time from clock 337 at the time the authorization code 340 was made, within a predetermined range. If the time on clocks 314 and 337 are used with a resolution of, say, ten minutes, then when authorization code 340 is received by controller 310, the present time from clock 314 may be used in the determination of a valid time, and if that doesn't work the next time interval may be tried (in case clock 314 was running slow), and the prior time interval(s) may be tried (in case clock 314 was running fast, or the user took some amount of time after code 340 was generated, but before entering authorization code 340 into keypad 104.

In fact, how many time steps earlier than the current reading of clock 314 may be tried is a matter of policy, and may differ by station. The reason whether a authorization code is good for a day, or only good for five minutes is that the "life" of an authorization code must be sufficient for a user to acquire authorization code 340 and leisurely enter it into keypad 104. This policy regarding the interval of when authorization code 340 remains valid and usable should consider that, in some situations, station 300 may be located in an underground garage, where there is no nearby wireless connectivity. When that is the case, a user using a cell phone or smart phone as interface computer 332 would need to return to the surface and leave the garage to gain wireless access for communication with authorization generating system 330, returning to station 300 some minutes later after obtaining authorization code 340. In another case, a code 340 might be provided by an employer or obtained by the user with an office computer as interface computer 332, only returning to station 300 some hours (or perhaps days) later.

Still another policy may be that code 340 is encrypted or digitally signed so as to make forging an authorization difficult. For example, if controller 310 has access to a cryptographic or hash key 312 with which it will decrypt or decode authorization code 340, or validate a signature within code 340, then authorization generating system 330 will have a corresponding key (not shown) suitable for preparing authorization code 340 in a manner compatible with the decoding or verification that controller 310 will perform. For example, if key 312 is the private cryptographic key of controller 310, then system 330 will have a copy of the corresponding public cryptography key (not shown). In some embodiments, the key used by system 330 to prepare authorization code 340 would be selected by station/lot/operator 326. In other embodiments, system 330 uses its own private key (not shown) to digitally sign or encrypt authorization code 340. In such a system, key 312 would be the corresponding public key suitable for verifying the signature or decrypting the authorization code 340 for validation and use.

In some embodiments, additional information may be requested by or provided to authorization generating system 330, for example, fleet ID 324. If an RFID ID 320 is to be authorized as or otherwise treated under policies applying to a special group (herein called a fleet), then fleet ID 324 may be supplied during the request made to system 330 for code 340. Fleet ID 324 may be used to select policies that apply to the generation or properties described by authorization code 340. For example, policies associated with a specific fleet ID may specify that an RFID ID to be learned in response to authorization code 340 is to remain valid only for one month (unless renewed), or may specify that use of the card represents a certain kind of transaction (e.g., billable to a particular entity), etc.

In some situations, the correct response (according to policy) may be for authorization generating system 330 to decline to generate RFID authorization code 340 for a particular RFID-specific code 322 (e.g., when it becomes known that the security of RFID ID 320 has been compromised, or when RFID ID 320 has reached some policy-limited number of authorizations.)

Figure 4:
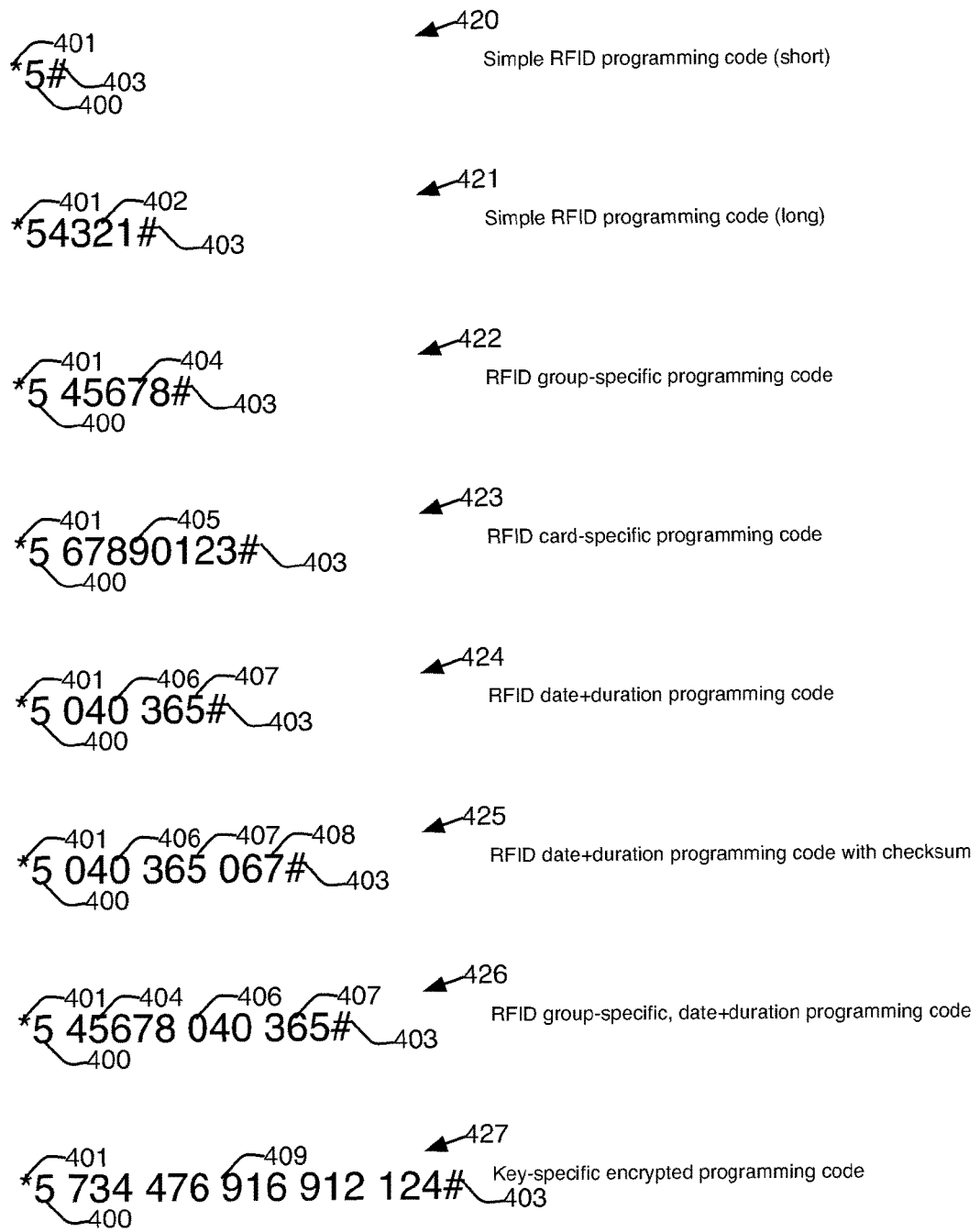
FIG. 4: show example commands and authorization codes for registering identification tokens.

FIG. 4, shows several example formats 420-427, of which formats 420-421 are suitable for learn command 122, formats 422-423 are suitable as authorization code, and 420-427 are suitable as authorization code 340. In formats 422-427 there is white space added to separate the sample codes into separately described parts. It would not be necessary for the user to enter the white spaces into keypad 104, and whether or not authorization codes are displayed with spaces embedded to improve readability is a matter of policy.

Simple RFID learn command format 420 comprises a single digit command comprising start symbol 401 ('*'), terminal symbol 403 ('#'), and single digit 400. Such a simple code might be printed in the operating manual for station 300, but may also be provided by authorization code system 330, allowing the single digit 400 to vary with different stations 300.

A longer RFID learn command 402 is provided in format 421. The greater count of digits in command 402 relative to single digit command 400, will make format 421 more secure (harder to guess). Further, as a matter of policy, command 402 may be time varying (i.e., is determined at least in part by clock 337) so that even when an effort to guess a correct authorization code 340 of format 421 is successful, the success is only temporary.

Authorization code format 422 comprises an identifier 404 that indicates or corresponds to a group or batch or numeric range corresponding to specific RFID ID 320. For example, if RFID card 320 can be known by system 330 to have internal data representative of being in a particular group (e.g., custom made RFID cards having a machine readable field whose value is unique to a particular operator or fleet). RFID specific code 322 allows system 330 to retrieve this information and use it to provide an authorization code 340. Alternatively, authorization code 222 may be provided in the form of format 422 so that when ID 220 is read by controller 210, at least a portion of the data read will correspond to group-specific code 404 in authorization code 222.

Likewise, authorization code format 423 comprises identifier 405 that indicates or corresponds to a specific identification 220 or 320, but in this case corresponds only to a single card. For instance, identifier 405 may be a copy of all or a portion of the identification readable from card 220 or 320. Or identifier 405 may be a hash of the identification readable from card 220 or 320.

As used in FIG. 2, authorization code 222 in format 422 or 423, may be printed onto or otherwise provided with RFID card 220. As used in FIG. 3, authorization code 340 in format 422 or 423 is supplied by authorization generating system 330.

Format 424 indicates a date 406, in this example given as a Julian date for the current year, and a duration 407 in days. When provided by system 330, date 406 indicates when the authorization started, and duration 407, when added to start date 406, indicates when the authorization should expire.

Format 425 is an example of a command or authorization comprising a checksum 408, which is used to provide a means of estimating whether the entered code was provided without typographic error, and whether the entered code is valid for station 300. For example, the algorithm or a parameter used to compute checksum 408 may be unique or otherwise rare. Thus, even if the rest of the code is easy to estimate, the checksum might be more difficult to guess. If the checksum doesn't correspond to the rest of the authorization code 340 in format 425, then the entry into keypad 104 can be rejected. A checksum could be further included in any of formats 421-427.

Format 426 shows a different arrangement of some of the elements discussed above, providing learn command 400, identifier 404 that is specific to an RFID ID, start date 406 and duration 407. Other combinations are usable, for example even if start date 406 were omitted, duration 407 could still be included (which may product the effect that whenever the corresponding RFID ID is learned for the first time, it remains valid for 365 days).

Finally, format 427 may be designated to be any of the above, or still another format using such components in a different order, etc., but then encrypted or otherwise encoded as the (in this example, 15-digit) coded message 409. Upon entry, coded message 409 would be decoded using cryptographic key 312, to obtain the plain text authorization code, which may be of formats 420-426, or some other predetermined format.

In some embodiments of formats 422-427, the learn command 400 may be omitted from the format, if it is otherwise apparent (e.g., from the length of an entry matching a format), that a compliant authorization code is not some other command or entry having another purpose. Likewise, formats may omit either or both of start symbol 401 and terminal symbol 403, since the primary purpose of start symbol 401 is to permit the input buffer to be flushed, while the purpose of the terminal symbol 403 is to signal the end of an entry and initiate the parsing. In lieu of the start symbol 401, the input buffer can be flushed automatically upon expiration of an appropriately predetermined timeout (e.g., 15 seconds) without a new entry. In lieu of terminal symbol 403, a buffer containing an number of entered characters corresponding to an expected format (and possibly after waiting for a shorter timeout if more than one length of format is acceptable), the buffer can be automatically parsed by processor 110, 210, 310.

Additionally, different formats 420-427 or others may apply to different stations 300, or may be selected according to various policies. For example, authorizations under a specific fleet ID might use a certain set of policies calling for one format (e.g., 427), whereas a default format used when no other special circumstances apply, might be format 424 with a default duration predetermined.

In still other embodiments, an authorization code may indicate a renewal of a previously learned RFID ID. Such a code might be used to extend or reset the authorization (e.g., for another three months) for an RFID ID previously known to the system, but not to authorize the RFID ID to be learned by a new system.

Figure 5:
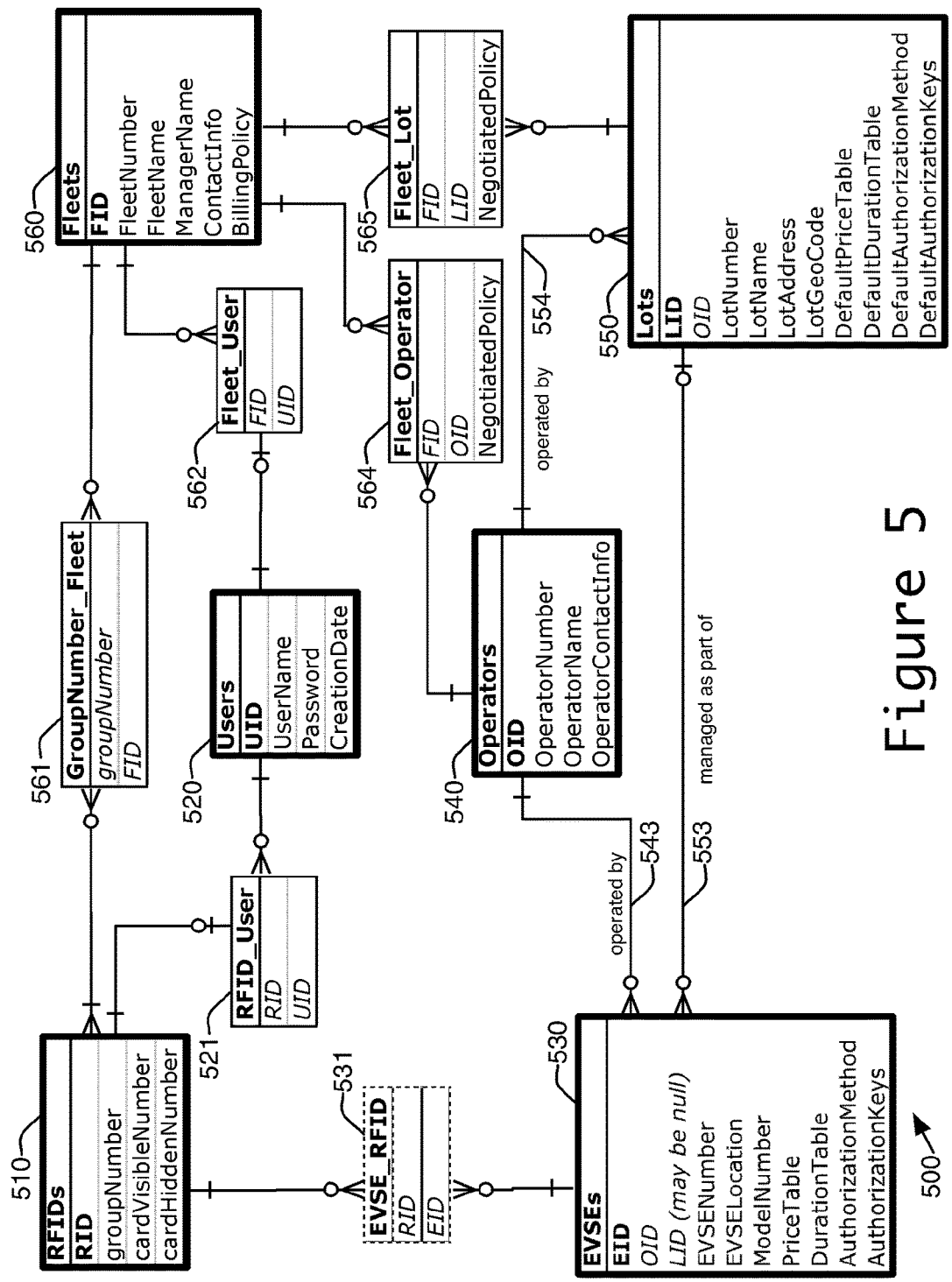
FIG. 5: is an example database schema used by a system for issuing commands and authentication codes.

While the database 338 may take many forms, a schema for one embodiment is shown in FIG. 5. Schema 500 includes RFIDs table 510, which lists for each RFID a unique identifier (RID) used within schema 500 for referring to specific RFID records within the table, a groupNumber for implementations where each RFID may be associated with a specific group (i.e., a fleet), and a cardVisibleNumber printed on the card, and a cardHiddenNumber, which would be the value read from RFID ID 320 by reader 102.

Users table 520 contains a record for each RFID ID holder. Records in Users table 520 each include fields such as a unique identifier (UID), UserName, Password, and CreationDate, plus other information as needed to administrate, such as user contact information. Each user is associated with one or more RFIDs by the records in RFID_User linking table 521, which forms an "issued" relationship between a user and the RFID ID(s), which have been issued to the user.

EVSEs table 530 comprises records having information about each station 300. Fields in EVSEs table 530 may include a unique identifier (EID), foreign key references (VID, LID), discussed below, an EVSENumber, which should be posted visibly on the corresponding EVSE, EVSELocation indicating where the EVSE is located, ModelNumber indicating the type of EVSE discussed, and the management policy and configuration information for each EVSE, in this example including the PriceTable, DurationTable, AuthorizationMethod, and AuthorizationKeys. The PriceTable would list the costs charged for using the EVSE for each of the durations listed in the DurationTable. The AuthorizationMethod identifies one or more formats (e.g., from FIG. 4 or others) and AuthorizationKeys identifies one or more keys to be used according to the AuthorizationMethod and corresponding to key 312 in station 300.

A relationship between EVSEs and the RFIDs for which authorizations have been issued may optionally be noted by records in EVSE_RFID linking table 531, which forms an "authorized" relationship between EVSE stations and RFID IDs for which authorization codes have been issued. Alternatively, such records may be created instead when an EVSE first reports having a transaction with a particular RFID ID.

Operators table 540 contains records with information about the owners or operators of the EVSEs in table 530. The OID is a unique identifier of these records. OperatorNumber can be used in reporting, and OperatorName and OperatorContactInfo are the real-world business name of the owner or the entity managing EVSEs or parking lots (i.e., the operator) and their contact information, respectively. Relationship 543 associates Operator records in table 540 with the one or more EVSE records in table 530 (the relationship 543 being formed by the foreign-key OID field in the EVSE records).

Lots table 550 contains records with information about parking lots, structures, or areas (e.g., ranges of city blocks having street parking managed as a collective entity). Each lot record contains a unique identifier LID, a foreign key VID (discussed below), a LotNumber, the LotName, LotAddress, location information LotGeoCode. Each record may also contain or reference management policy and configuration information DefaultPriceTable, DefaultDurationTable, DefaultAuthorizationMethod, and DefaultAuthorizationKeys. Such information would apply to each EVSE station associated in relation 553 with the lot (the relationship 553 being formed by the foreign key LID field in the EVSE records), unless the associated EVSE record in table 530 has values that override the lot defaults. Each lot is operated by an operator, as shown by relationship 554 (relationship 554 being formed by the foreign key OID field in the lot's records).

Thus, each EVSE may belong to a lot, and each EVSE and lot is operated by an Operator (or Owner). In some embodiments, Operator records may contain a DefaultAuthorizationMethod or other fields (not shown in Operator table 540 embodiment shown in FIG. 4) discussed in conjunction with the records of tables 530 and 550, that would apply to all Lots or EVSE having "operated by" relationship 543 or 554 with a record in Operators table 540.

Finally, groups of users can be recorded in Fleets table 560. A fleet record includes a unique identifier FID, a FleetNumber (e.g., corresponding to Fleet ID 324), FleetName, the ManagerName for addressing fleet-related issues, ContactInfo, and BillingPolicy.

A user's membership in a fleet is tracked by records in Fleet_User linking table 562. For example, if a particular fleet represents an employer's sponsorship of its employees parking, the employees would each be represented by records in Users table 520 and records in Fleet_User table 562 would associated those user records with the employer's fleet record. Further, GroupNumber_Fleet table 561 may be used to associate the groupNumber of RFID records in table 510 with fleets to which the RFID's user belongs.

Also, fleets (which may, in fact, correspond to individual users or families sharing several RFID IDs), may make contractual arrangements with operators. For example, an operator may be a municipal department responsible for public parking. A fleet may make arrangements with the operator (e.g., a municipality) to pay for parking fees accrued by its employees using fleet-registered RFIDs (i.e., belonging to users belonging to fleets). Such arrangements may be noted in the records Fleet_Operator linking table 564, in which besides the FID and OID foreign keys making the link, a notation of NegotiatedPolicy may be kept so that an automated system can properly bill for the appropriate fleet, and/or report to the appropriate operator. Similarly, a fleet may have a negotiated rate or other arrangement with an operator, but for a particular lot, as noted in the records of Fleet_Lot table 565, which provides similarly to table 564.

Schema 500 represents one possible database, of many suitable for use when implementing the present invention. Depending on ordinary implementation decisions, those skilled in the art may omit some of the fields herein identified, or may include additional fields. Further, schema 500 may be radically simplified, especially for implementations where one or more of lots, operators, or fleets is one or zero.

Figure 6:
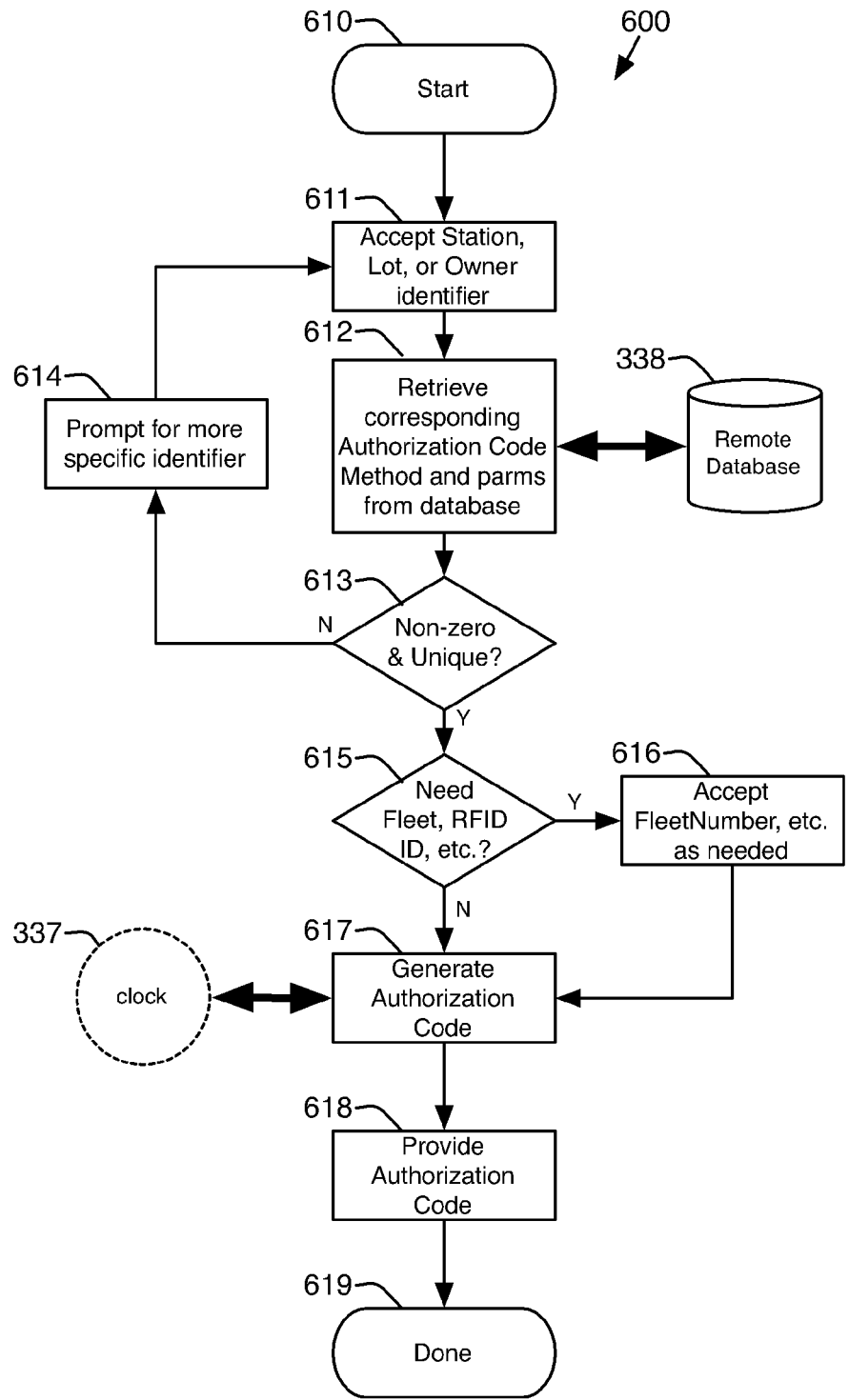
FIG. 6: is a flowchart for a process of issuing an authentication code for registering an identification token.

FIG. 6 shows an authorization code generation process 600 implemented by at least one of the computers of authorization code generating system 330. Process 600 begins at 610, where system 330 is waiting for an authorization code request. At 611, station/lot/operator ID 326 is provided, for example by a user reading indicia 302 or from another source, and accepted by system 330.

At 612, identifier 326 is used to identify one or more records in tables 540, 550, and 530 having a OperatorNumber, LotNumber, or EVSENumber (station number) respectively, that corresponds to ID 326.

Typically, identifier 326 is a station number and matches a single EVSENumber uniquely identifying an EVSE record in EVSE table 530. The AuthorizationMethod found in this record is noted.

The AuthorizationMethod may comprise or indicate information specifying an access code format (e.g., providing the information similar to the authorization code formats 420-427 in FIG. 4), for which the individual fields will be populated to form authorization code 340. The information required to provide the parameters to the AuthorizationMethod are set or obtained, for example by reference to database 338 and/or the current value of clock 337. Examples of information records of which zero or more might be retrieved from database 338 to be used in generating authorization code 340 includes: Default duration for authorizing an RFID in association with an EVSE, lot, or operator (which might be stored in any of tables 530, 550, or 540, respectively (none shown); the groupNumber or cardHiddenNumber of RFID ID 320 from table 510; the Authorization Keys from tables 530 or 550 suitable to provide encryption or digital signature for authorization code 340 in order to be decrypted or validated with key 312; and the command value 400 or sequence 402 appropriate to a EVSE, as might be stored EVSEs table 530 (field not shown in FIG. 5).

When a single EVSENumber is provided, corresponding parameters from the identified EVSE record and related records available in database 338 are also retrieved. Parameters retrieved in this way will be non-ambiguous.

However, in embodiments in which at 611 a LotNumber or OwnerNumber may be accepted, then the procedure must check for potential ambiguities. For example, if a record in Lot table 550 indicates a De.faultAuthorizationMethod for its EVSEs, and none of the corresponding EVSE records indicate a different AuthorizationMethod, and likewise for each of the parameters required by the DefaultAuthorizationMethod found in database 338, then there will be no ambiguity. But if even a single corresponding EVSE record indicates a different AuthorizationMethod, or relates a different value for one of the DefaultAuthorizationMethod's parameters, then an ambiguity results (i.e., the EVSEs in the Lot specified might require one or another authorization method and from the identity 326 initially given, the process 600 can't tell which). A similar ambiguity might result when an OwnerNumber is accepted at 611.

In embodiments that at 611 accept only a station identifier, the identifier can, at most, identify exactly one record in the EVSE table 530. However, a mistaken entry might identify no records. On the other hand, if at 611 any of a station, lot, or owner identifier may be accepted, then zero or more EVSE records might be associated with the identification. If there are a plurality of EVSE records associated with the identifier accepted, there may or may not be a plurality of AuthorizationMethod identified or even if only a single AuthorizationMethod is identified, there may still be a plurality of parameter values associated with the individual EVSEs indicated.

Thus, at 613, a test must be made to ensure that, at least one EVSE record is identified and that exactly one AuthorizationMethod and associated parameter values are obtained using identifier 326. This ensures that there is exactly one authorization code to be generated, with no ambiguity.

If at 613 there are zero EVSE records identified, or for a plurality of EVSE records a plurality of non-duplicative AuthorizationMethod or parameter values is found, then the test fails and processing continues at 614 where the process 600 prompts for a more specific identifier 326.

If, however, at 613, the test finds that identifier 326 identifies exactly one EVSE record or corresponds to a plurality of EVSE records for which exactly one non-duplicative AuthorizationMethod is associated and for which exactly one non-duplicative set of parameters is found, then the authorization method and parameters are unique, there is no ambiguity, and process 600 continues at 615.

At 615, a determination is made of whether a FleetNumber (Fleet ID 324) or RFID specific code 322, or other user supplied data, is required. Such a requirement would come from the unique AuthorizationMethod obtained at 612. If any Fleet ID 324, RFID specific code 322, or other user supplied data (not shown) is required, then at 616 a the additional required data is accepted by system 330. If needed, a prompt for the information can be given (not shown).

Regardless of the path taken from 615, the process continues at 617. At 617, the unique AuthorizationMethod and the required parameters retrieved from database 338 at 612 and those accepted at 616 (if any), are used to generate authorization code 340. Additional parameters not available from database 338 or otherwise accepted, e.g., the current value of clock 337, are also used.

At 618, authorization code 340 is provided by system 330 to eventually be used to indicate to station 300 that RFID ID 320 is authorized for future access.

In an alternative embodiment in which only one authorization method is used and know at start 610 of process 600, then at 612 only the required corresponding AuthorizationKeys or other parameters in database 338 are retrieved for use in generating authorization code 340 at 617, with or without using clock 337 in accordance with the one authorization method.

In still another embodiment in which only one authorization method is used and known at start 610 of process 600, and in which no authorization keys or other information in database 338 are needed, then at 612 only a verification is made to ensure that there exists at least one EVSE record corresponding to the identity 326 accepted at 611. Authorization code generation takes place at 617, with or without using clock 337, in accordance with the one authorization method.

Figure 7:
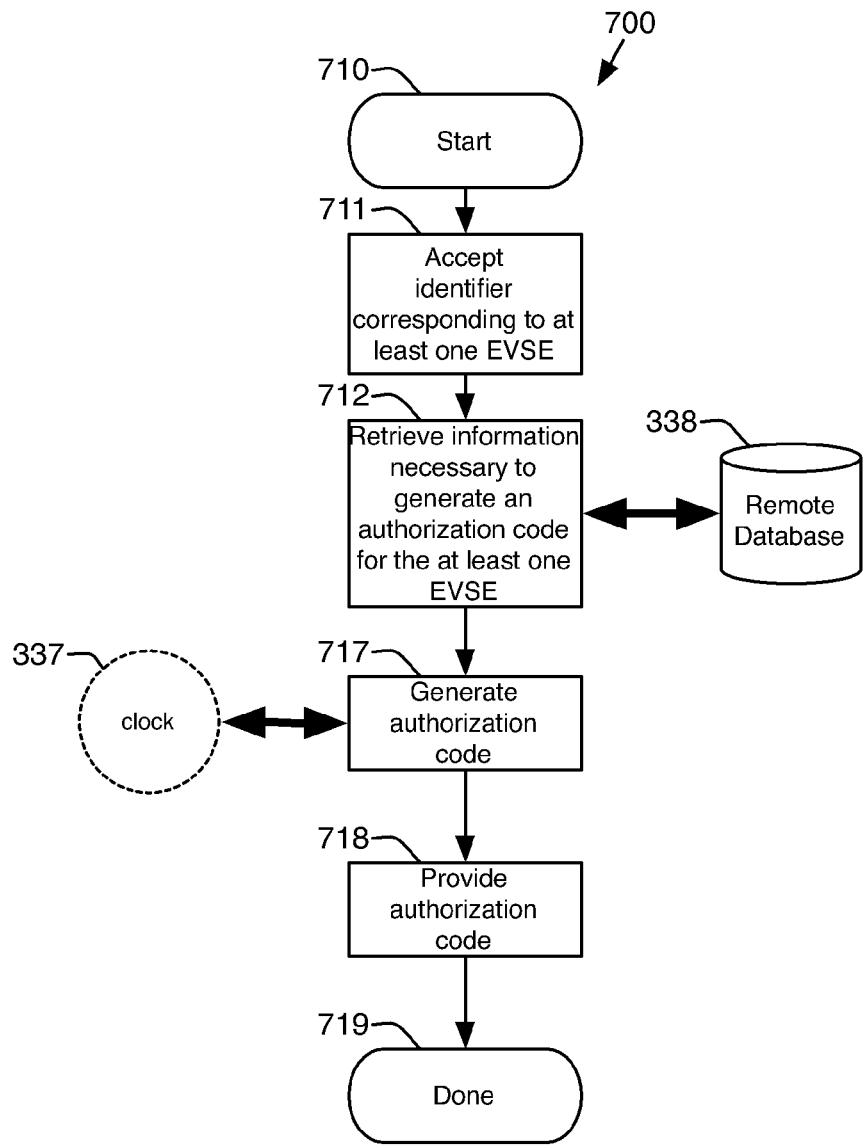
FIG. 7: is a flowchart for another process of issuing an authentication code for registering an identification token.

FIG. 7 shows another authorization code generation process 700 implemented by at least one of the computers of authorization code generating system 330. Process 700 begins at 710, where system 330 is waiting for an authorization code request. At 711 an identifier is received indicating at least one EVSE for which authorization is requested.

At 712, information necessary for generating authorization codes apropos to the at least one EVSE is retrieved. Such information may comprise an authorization method (if there is more than one used by the process 700), authorization keys, and other items, for example such as those listed in conjunction with 612.

At 717, authorization code 340 is generated using the information retrieved at 712. Authorization code 340 is provided in response to the request at 718. Process 700 completes at 719.

Figure 8:
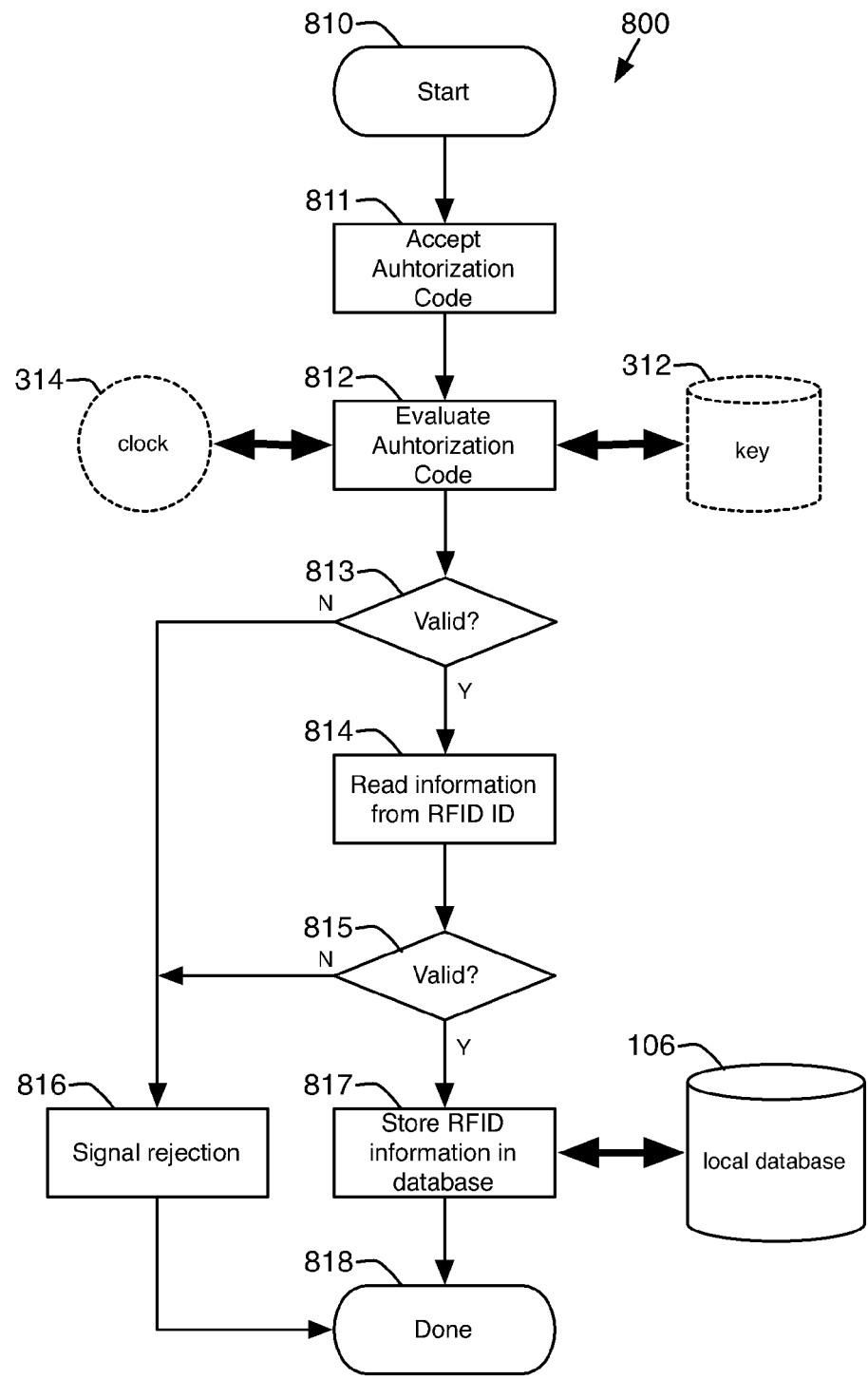
FIG. 8: is a process for accepting authentication codes for registering an identification token.

FIG. 8 shows a flowchart for RFID authorizing process 800 in which a station 200, 300 is authorized to accept an RFID ID 220, 320 for future use, the process being implemented by controller 210, 310 of station 200, 300, all respectively.

Process 800 begins at 810 with controller 210, 310 ready. At 811, controller 210, 310 accepts an authorization code 222, 340 through keypad 104.

The authorization code 222, 340 is evaluated at 812 by controller 210, 310 (controller 310 able to use key 312 and the current value of clock 314, if and as needed). Authorization code 222, 340 is evaluated in accordance with at least one predetermined format (e.g., 420-427) for authorization code 222, 340.

For example, if authorization code 222, 340 does not match one of the predetermined formats (e.g., it is too long or too short or doesn't include start token 401 or end token 403, if required), then authorization code 222, 340 would not be valid for that format.

As another example, if a predetermined command (e.g., 400, 402) were expected in authorization code 222, 340 of a given format, but not found, then authorization code 222, 340 would not be valid for that format.

In another example, if the evaluation of the checksum of a predetermined portion of authorization code 222, 340 of a given format did not match the checksum 408 supplied in authorization code 222, 340, then authorization code 222, 340 would not be valid for that format.

If a predetermined format requires use of key 312, but an attempt to decrypt or validate the digital signature of an authorization code 222, 340 does not succeed, the authorization code 222, 340 would not be valid for that format.

For example, if authorization code 340 were to include a date 406, then the current value of clock 314 would be examined to determine whether date 406 is equal to or earlier than the current date/time from clock 314. If desired, the comparison may allow for a predetermined tolerance T, whereby the value of the clock 314 would be examined to determine whether date 406 less T is equal to or earlier than the current date/time from clock 314, whereby the evaluation accommodates a misadjustment of clock 314 of up to T. If the current reading of clock 314 is in advance of date 406 (by more than T, if T is used), then the authorization code 340 is not yet valid.

Similarly, if authorization code 340 were to include both a date 406 and a duration 407, and the present time on clock 314 is after date 406+duration 407, then authorization code 340 is not valid because it has expired. Alternatively, if an authorization code 340 is only valid for a predetermined time V, and the present time on clock 314 is greater than date 406+V, then under this alternative, authorization code 340 has expired.

From the above, those skilled in the art would be able to identify other validity tests suitable for selected authorization code formats and values.

If at 813, there remains at least one of the predetermined authorization code formats for which authorization code 222, 340 was evaluated in 812 and not found to be invalid, then process 800 continues at 814. If, however, authorization code 222, 340 has been found to be invalid for all of the predetermined authorization code formats used in step 812, then the authorization code 222, 340 is rejected, and at 816 the rejection is indicated, after which process 800 ends at 818.

In the case where the authorization code 222, 340 has been sufficiently validated at 813, then at 814 information is read from RFID 220, 320 by controller 210, 310 with reader 202, 102. (In another embodiment where the identity token is a biometric measure analogous in this embodiment by RFID ID 340, then those skilled in the art will recognize that this corresponds to information about the biometric token obtained through a reading made with biometric reader 102.)

At 815 a check is made to determine whether the information obtained at 814 is valid, including with respect to authorization code 222, 340.

For example, the information may be expected to have a predetermined length or range of acceptable lengths. If the information read at 814 is not within an acceptable range of the predetermined length, then the RFID ID is considered not valid.

In another example, if a remaining authorization code format candidate has a groupNumber 404 or a RFID ID specific code 405 that is not matched by the information read at 814, then RFID ID is not valid for that format.

At 815, if there is one authorization code format candidate for which the information read at 814 is valid, then process 800 continues at 817. Otherwise, RFID ID is rejected and that rejection can be indicated at 816.

When a valid authorization code 222, 340 is provided with a correspondingly valid RFID ID 320, then at 817 information representative of RFID ID 320 is stored in local database 106 whereby future presentations of RFID ID 320 will be recognized and result in EVSE 108 being accessible to a user presenting RFID ID 320.

Additionally, if authorization code 222, 340 includes a duration 407 or a predetermined default duration (not shown) is used as a matter of policy, then the information representative of RFID ID 320 additionally comprises an expiration date after which RFID ID 320 will not be accepted (unless RFID ID 320 is subsequently renewed).

At 818, process 800 has either accepted or rejected authorization code 222, 340 and RFID ID 320.

Several descriptions and illustrations have been presented to aid in understanding the features of the present invention. One skilled in the art will realize that numerous changes and variations can be made without departing from the spirit of the invention. Each of these changes and variations are within the scope of the present invention.

The invention claimed is:

1. A first system for controlling operation of a second system, the first system comprising:
   a controller;
   a reader, the controller able to read a first identification presented by a user through said reader, the first identification read as a first data representative of the first identification;
   a keypad, the controller able to accept a learn command from the user through said keypad, the learn command having been provided to the user, of the learn command comprising a second data representative of a duration; and,
   a memory accessible by the controller; wherein,
   if the first identification is presented to the reader, the controller allows operation of the second system if the first data is in the memory, otherwise the controller does not allow operation of the second system; and,
   if the learn command is accepted and validated by the controller and the first identification is presented to the reader, the controller adds the first data to the memory to expire after the duration has elapsed, otherwise the first data is not added to the memory.

2. The first system of claim 1, wherein the first identification comprises an indicia, and at least a portion of the second data is representative of the indicia.

3. The first system of claim 1, wherein at least a portion of the learn command indicates the duration, and the controller deletes the first data after the duration is elapsed.

4. The first system of claim 1, wherein the learn command comprises a checksum and the learn command being validated by the controller is based on the checksum corresponding to the rest of the learn command.

5. The first system of claim 1, further comprising:
   a first clock providing a current time to the controller;
   wherein, the second data is representative of the start time and the learn command being validated by the controller is based on a start time and the current time.

6. The first system of claim 5, wherein the second data is representative of the duration and the learn command is not validated by the controller if the current time is after the start time plus the duration.

7. The first system of claim 5, wherein the learn command is not validated by the controller if the current time is after the start time plus the duration.

8. The first system of claim 1, wherein the learn command is encrypted and the controller decrypts the learn command.

9. The first system of claim 8, wherein the controller has a first key used when decrypting the learn command.

10. The first system of claim 1, wherein the second data is specific to a specific group of identifications comprising the first identification.

11. A third system to generate the learn command for the first system of claim 5, comprising:
   a) a processor having access to a communication channel, the processor having programming to perform the steps:
      1) accept a request through the communication channel, the request comprising a third data representative of a time;
      2) generating the learn command using the third data; and
      3) returning the learn command through the communication channel;
   wherein the steps 2) and 3) are performed in response to the request.

12. A third system to generate the learn command for the first system of claim 5, comprising:
   a) a second clock, the second clock synchronized with the first clock;
   b) a processor having access to a communication channel, the processor able to read the second clock, the processor further having programming to perform the steps:
      1) accept a request through the communication channel,
      2) reading a first time from the second clock;
      3) generating the learn command using the first time as the start time; and
      4) returning the learn command through the communication channel;
   wherein the steps 2), 3), and 4) are performed in response to the request.

13. A third system to generate the learn command for the first system of claim 2 comprising:
   a) a processor having access to a communication channel, the processor having programming to perform the steps:
      1) accept a request through the communication channel, the request comprising a third data representative of the indicia;
      2) generating the learn command using the third data; and
      3) returning the learn command through the communication channel;
   wherein the steps 2) and 3) are performed in response to the request.

14. A third system to generate the learn command for the first system of claim 9 comprising:
   a) a processor having access to a communication channel, the processor having access to a second key for encryp tion corresponding to the first key, the processor having programming to perform the steps:
1) accept a request through the communication channel, the request comprising identifying information corresponding to the first key;
2) determining the second key corresponding to the identifying information;
3) generating the learn command using the second key; and
4) returning the learn command through the communication channel;
wherein the steps 2), 3), and 4) are performed in response to the request.

15. A first system for controlling operation of a second system, the first system comprising:
a controller;
a reader, the controller able to read a first identification presented by a user through said reader, the first identification read as a first data representative of the first identification;
a keypad, the controller able to accept a learn command from the user through said keypad, the learn command having been provided to the user, the learn command comprising a second data representative of a duration; and,
a memory accessible by the controller; wherein,
if the first identification is presented to the reader, the controller allows operation of the second system if the first data is in the memory and not expired, otherwise the controller does not allow operation of the second system; and,
if the learn command is accepted and validated by the controller and the first identification is presented to the reader, the controller adds the first data to the memory to expire after the duration has elapsed, otherwise the first data is not added to the memory.

16. A first system for controlling operation of a second system, the first system comprising:
a controller;
a reader, the controller able to read a first identification presented by a user through said reader, the first identification having an indicia, the first identification read as a first data representative of at least a portion of the indicia;
a keypad, the controller able to accept a learn command from the user through said keypad, the learn command having been provided to the user, the learn command comprising a second data representative of a duration and at least the portion of the indicia; and,
a memory accessible by the controller; wherein,
if the first identification is presented to the reader, the controller allows operation of the second system if at least a portion of the first data is in the memory, otherwise the controller does not allow operation of the second system; and,
if the learn command is accepted and validated by the controller and the first identification is presented to the reader, the controller adds a portion of the first data to the memory to expire after the duration has elapsed, otherwise the first data is not added to the memory.

* * * * *